United States Patent [19]

Franke et al.

[11] 4,042,318

[45] Aug. 16, 1977

[54] APPARATUS FOR THE CONTINUOUS MELTING OF SALTS USED FOR MODIFYING THE PROPERTIES OF ARTICLES OF GLASS OR SIMILAR MATERIALS

[75] Inventors: Johannes Franke; Kurt Kessler, both of Jena; Wolfgang Muller, Berlin; Heinz Sauerbier, Camburg; Kurt Schneider; Karl Unbehaun, both of Jena, all of Germany

[73] Assignee: VVB Haushalts- und Verpackungsglas, Weisswasser OL, Germany

[21] Appl. No.: 597,052

[22] Filed: July 18, 1975

[30] Foreign Application Priority Data

July 31, 1974  Germany .............................. 0318021

[51] Int. Cl.[2] ............................................ F27B 14/08
[52] U.S. Cl. ............................ 432/210; 126/343.5 A; 432/212
[58] Field of Search ............................... 432/210, 212; 126/343.5, 343.5 A

[56] References Cited

U.S. PATENT DOCUMENTS

| 507,460 | 10/1893 | Simonds | 432/212 |
|---|---|---|---|
| 1,466,637 | 8/1923 | Babb | 126/343.5 A |
| 3,804,154 | 4/1974 | Asdell et al. | 126/343.5 A |

Primary Examiner—John J. Camby
Attorney, Agent, or Firm—Nolte and Nolte

[57] ABSTRACT

For the continuous melting of salts to be used for modifying the properties of objects of glass or similar materials, an apparatus is provided with inner and outer vessels, an annular chamber between the vessels for containing a heat exchange fluid, ribs on the outer walls of the inner vessel for guiding the heat exchange fluid and assisting heat exchange from the heat exchange fluid to the inner vessel, means for transferring heat to the heat exchange fluid, means for circulating the heat exchange fluid through the chamber, means for admitting the salt to the inner vessel, the inner vessel having an upper portion of a semi-circular profile defining a radiant heating surface for radiating heat downwardly onto the salt and having a lower portion of approximately triangular to parabolic profile defining a conduction heating surface for transferring heat to the salt by conduction, the upper surface to be formed by the salt charged to the inner vessel defining a melting surface and the ratio of the area of the radiant heating surface to the melting surface being in the range of 1.4:1 to 1.57:1 and the ratio of the area of the conduction heating surface to the melting surface being in the range of 2.5:1 to 4:1.

3 Claims, 3 Drawing Figures

APPARATUS FOR THE CONTINUOUS MELTING OF SALTS USED FOR MODIFYING THE PROPERTIES OF ARTICLES OF GLASS OR SIMILAR MATERIALS

This invention relates to an apparatus for the continuous melting of salts, preferably salts such as $KNO_3$, $NaNO_3$ and $LiNO_3$ or mixtures of any or all of these, which are used to modify the physical and/or chemical properties of objects of glass or similar materials.

Baths of molten salts of alkali and alkaline earth metals are used for the modification of the physical and/or chemical properties of glasses or similar materials. The baths supply ions which diffuse into the glass and therein exchange with other ions. The salt baths, for example molten sodium or potassium salts or molten mixtures of these salts are, therefore, formulated according to the modified glass type to be made at the time and the temperatures necessary to effect the modification. Alkali metal nitrates are preferably used.

The modification of the properties of the glass or similar material is carried out in a vessel which can receive a bath of molten salt or salts. The vessel is equipped with heating apparatus which allows the bath to be maintained in a molten condition or allows salts introduced into the vessel in a solid condition to be melted and further heated up.

The prior art has not provided an apparatus for melting salts or salt mixtures which in the molten condition are to be introduced into the vessels for the modification of the properties of glasses or similar materials.

It is an object of the invention to eliminate the deficiency of the lack of such an apparatus. Other objects and advantages of the invention will be apparent to those skilled in the art from the herein description thereof.

According to the invention, there is provided a controllable apparatus which is suitable for melting salts of alkali or alkaline earth metals or mixtures thereof continuously so that they can be used for the modification of the physical and/or chemical properties of glasses or similar materials.

In particular, the apparatus of the invention is provided with in themselves known ventilators and heat exchangers and with flow guiding and heat transmission ribs over its entire surface, and has a heatable inner vessel having upper and lower parts and an outer vessel provided with external insulation with the inner vessel being so arranged in the outer vessel that a chamber to receive a heating medium is formed therebetween, and the upper part of the inner vessel has a semi-circular cross section defining a radiant heating surface over the melting surface for the solid salt and the lower part of the inner vessel has an approximately triangular to parabolic cross section defining a heat conducting surface, and the ratio of the area of the radiant heating surface to the area of the melting surface for the solid salt is from 1.4:1 to 1.57:1 and the ratio of the area of the heat conducting surface of the lower part to the melting surface for the solid salt is from 2.5:1 to 4:1.

Furthermore, partitions provided with perforations or arranged in cascade fashion heightwise are installed in the lower part of the inner vessel.

In order to be able to inspect the device for wear from all sides, some of the conduction and heat transfer ribs of the inner vessel approach the outer vessel closely and are mounted on a slide rail for removal of the inner vessel from the outer vessel. On the other hand, the fans and heat exchangers are also removable from the outer vessel for inspection purposes. For the prevention of an overflow of solid salt from the bath surface into an overflow nipple located on the opposite face, the bath area is divided by partitions provided in cascade fashion in the lower part of the inner vessel. The division is brought about having some partitions project to slightly above the bath surface.

This arrangement of the partitions has the effect of prolonging the path the salt must travel through the inner vessel in such manner that, even at a great specific melting efficiency and relatively small bath volume, the salt bath can be adequately degassed and homogenized.

The designs and configurations of the heating surfaces and the ratios of the heating surfaces area to the melting surface area effect a high specific melting efficiency in that the solid salt to be melted, introduced into the inner vessel and floating in part on the bath surface is melted predominantly only by radiated heat, transferred concentrically with high energy density to the salt to be melted by a radiation heating surface of semi-circular profile. The carrying off of particles of the solid salt by convection heat currents is largely avoided in this manner.

Melting of the solid salt which after its introduction to the salt bath becomes immersed therein, is accomplished by the direct heat condition of the salt bath, the required amount of heat being transferred by the heat transfer surface of the lower part of the inner vessel, which heat transfer surface is large in proportion to the bath surface or "melting surface."

In addition, the closed construction of the inner vessel of the device provides complete safety in charging the vessel with solid salt, prevents solid salt dust from being carried into heat exchangers of the entire heating system, and provides a well engineered, complete discharge of toxic gases and other degassing products which form during the melting operation.

Another advantage of the device is that molten salt can be supplied continuously at a fixed temperature to one or more vessels for the modification of the properties of objects made of glass or similar materials without interruption of the treating process.

The invention will now be further described by reference to a specific, preferred, illustrative embodiment thereof, as shown in the drawings wherein.

Figure 1:
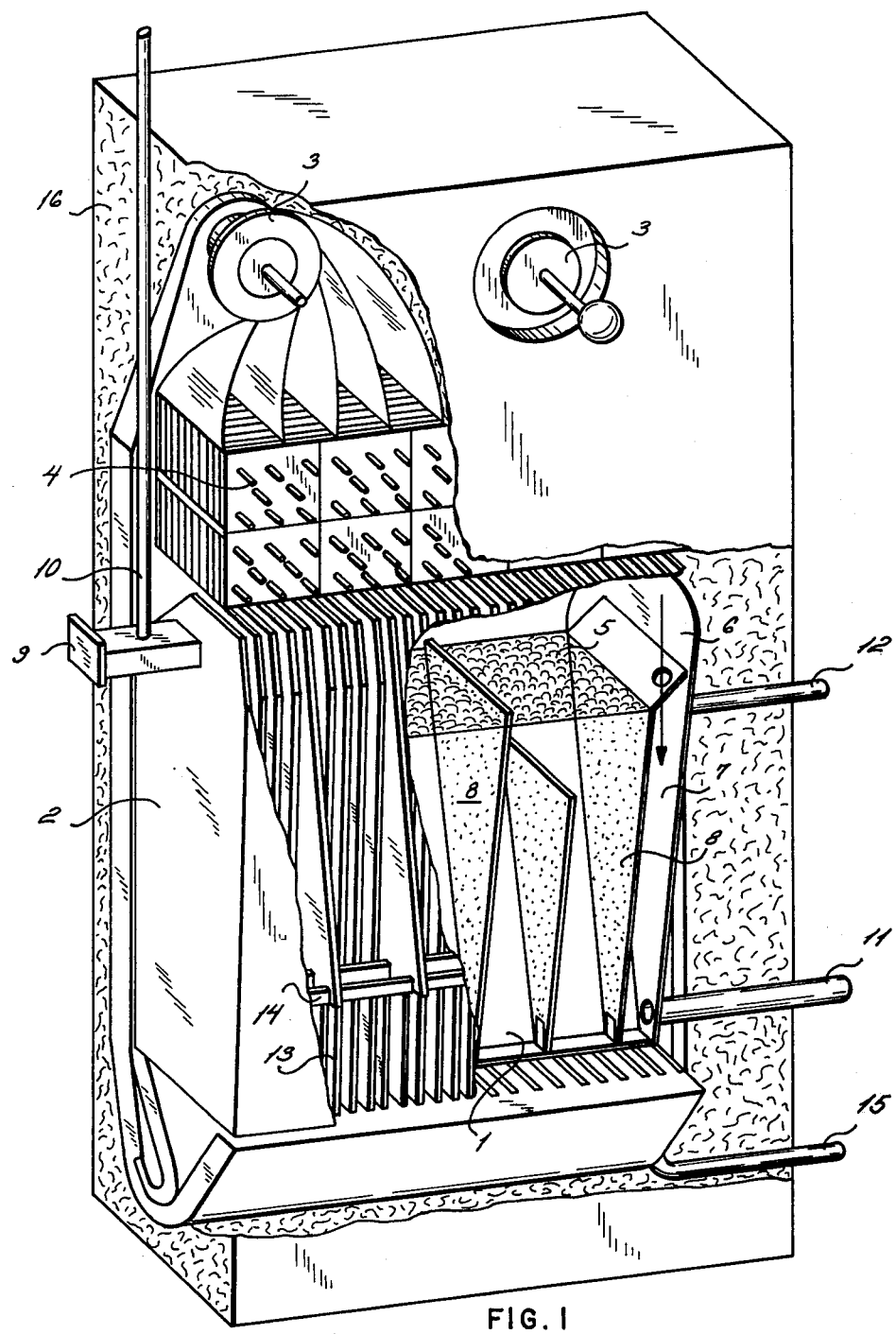
FIG. 1 is a partly cut away perspective view of an apparatus according to the invention.
Figure 2:
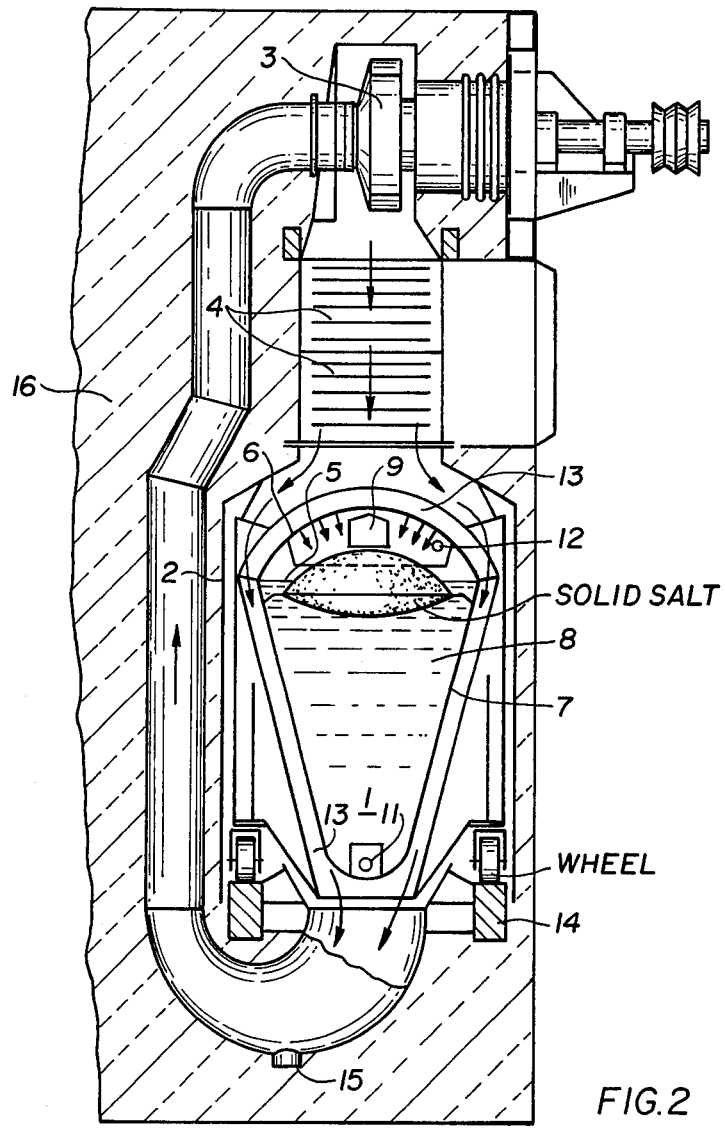
FIG. 2 is a vertical sectional view of the apparatus illustrated in FIG. 1.
Figure 3:
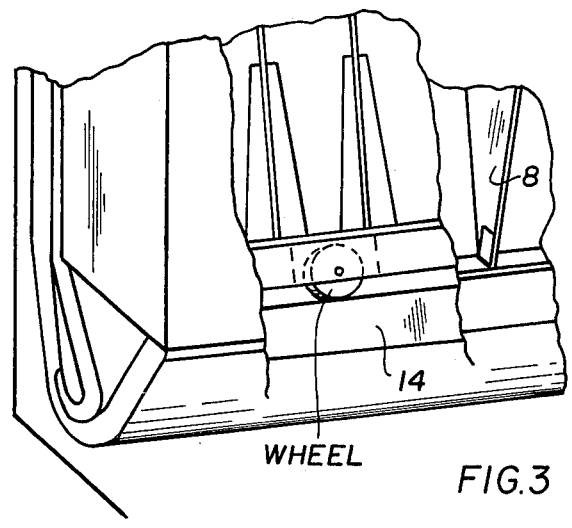
FIG. 3 is a fragmentary perspective view partly cut away of the lower portion of the apparatus illustrated in FIG. 1.

The apparatus for the continuous melting of salt consists of an inner vessel 1 and an outer vessel 2 with external insulation 16, both inner vessel 1 and outer vessel 2 being tightly closed metal tanks. The vessel 1 is nested in the vessel 2 so that a chamber to contain and guide the heating medium is formed between their walls.

The heating medium is supplied to the chambers by fans 3 and heat exchangers 4 disposed above the inner vessel 1 and the heating medium is returned to the fans 3 through a pipe system.

The inner vessel 1 consists of upper part 6 and lower part 7. Inserted in the lower part 7 are partitions 8 which have perforations and are arranged in cascade fashion. The apparatus has nipples penetrating the outer tank 2, such as a filler nipple 9 for solid salt, a venting nipple 10 for waste gases of the salt, an overflow nipple 12 for molten salt and a drainage nipple 11 to drain the entire contents of the inner vessel 1. A leaked salt nipple 15 is provided in the pipe system below the inner vessel for inspection and removal of leaked salt. Drainage nipple 11, overflow nipple 12 and leak salt nipple 15 can be heated.

For better heat transfer from the heating medium to the inner vessel 1 there are welded to the outside of the inner vessel 1 conduction and heat trasfer ribs 13, some of which are mounted on a slide rail 14. Fans 3, heat exchangers 4 and inner vessel 1 are arranged so as to be removable from the outer vessel 2.

To operate the device, solid salt is supplied to the melting surface 5 through a conventional charging device (not illustrated) and a filler nipple 9, melted by means of the heating device, heated to a temperature of 400–500° C., and degassed and homogenized as it passes through the lower part 7 provided with the partitions 8 having perforations and being arranged in cascade fashion. The molten salt flows to the tanks for the modification of the physical and/or chemical properties of objects made of glass or similar materials through overflow nipples 12, whereby it is possible to keep the temperature of the molten salt constant.

What is claimed is:

1. Apparatus for the continuous melting of salts which are to be used to modify properties of objects of glass or similar materials, the apparatus comprising an outer vessel, an inner vessel nested in the outer vessel with an annular chamber for heat exhange fluid being formed between the outer vessel and the inner vessel, ribs on the outer walls of the inner vessel for guiding the heat exchange fluid and assisting heat exchange from the heat exchange fluid to the inner vessel, means for transferring heat to the heat exchange fluid, means for circulating the heat exchange fluid through said chamber, means for admitting into the inner vessel the salt to be melted, the inner vessel having an upper portion of a semi-circular profile defining a radiant heating surface for radiating heat downwardly onto the salt and having a lower portion of approximately triangular to parabolic profile defining a conduction heating surface for transferring heat to the salt by conduction, the upper surface of the lower portion to be formed by the salt charged to the inner vessel defining a melting surface and the ratio of the area of the radiant heating surface of the upper portion to the melting surface defined by the upper surface of the lower portion being in the range of 1:4:1 to 1.57:1 and the ratio of the area of the conduction heating surface to the melting surface being in the range of 2.5:1 to 4:1.

2. Apparatus according to claim 1, further comprising arranged in the lower portion of the inner vessel, upright partitions of differing heights and provided with perforations.

3. Apparatus according to claim 1, further comprising a slide rail for facilitating removal of the inner vessel from the outer vessel and wherein some of the ribs closely approach the outer vessel and are mounted on the slide rails, the slide rail extending transversely to the ribs adjacent the lower portion of the inner vessel.

* * * * *